(12) United States Patent
Zimmermann et al.

(10) Patent No.: US 11,313,818 B2
(45) Date of Patent: Apr. 26, 2022

(54) SYSTEM AND ARRANGEMENT FOR AUTOMATIC DISTILLATION MEASUREMENTS

(71) Applicant: Anton Paar ProveTec GmbH, Blankenfelde-Mahlow (DE)

(72) Inventors: Frank Zimmermann, Schöneiche (DE); Carsten Kindt, Berlin (DE); Daniel Pergande, Teltow (DE)

(73) Assignee: Anton Paar ProveTec GmbH, Blankenfelde-Mahlow (DE)

( * ) Notice: Subject to any disclaimer, the term of this patent is extended or adjusted under 35 U.S.C. 154(b) by 360 days.

(21) Appl. No.: 16/413,368

(22) Filed: May 15, 2019

(65) Prior Publication Data
US 2019/0353603 A1 Nov. 21, 2019

(30) Foreign Application Priority Data
May 16, 2018 (DE) ...................... 10 2018 111 790.6

(51) Int. Cl.
*G01N 25/02* (2006.01)
*G01N 25/08* (2006.01)

(52) U.S. Cl.
CPC .................................. *G01N 25/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,676,914 A | | 4/1954 | Podbielniak | |
| 3,832,142 A | * | 8/1974 | Syrop | C07C 205/06 422/280 |
| 5,433,105 A | * | 7/1995 | Takahashi | G01N 25/14 73/61.46 |
| 5,447,374 A | | 9/1995 | Fraser et al. | |
| 5,814,721 A | * | 9/1998 | Mills | G01N 33/2847 374/16 |

(Continued)

FOREIGN PATENT DOCUMENTS

CH 568 570 A5 10/1975
CN 202315368 U 7/2012

(Continued)

OTHER PUBLICATIONS

EPO Translation of CN204214564U Lab flask temperature measuring device (Year: 2015).*

*Primary Examiner* — Lisa M Caputo
*Assistant Examiner* — Nasir U. Ahmed
(74) *Attorney, Agent, or Firm* — Robert A. Blaha; Smith Tempel Blaha LLC

(57) ABSTRACT

An arrangement for closing a container, in particular a flask, for determining evaporation properties of a liquid in the flask according to at least one standardized test. The arrangement has at least one temperature measurement system, a sensor, a closing element adapted for contacting a surface of an opening in the container for closing the container and having a through-opening through which a portion of the temperature measurement sensor is guided such that a lower end of the sensor is arranged within the container. The arrangement further includes a mechanism for adjusting a position of the lower end of the sensor along a longitudinal direction of the temperature measurement sensor.

19 Claims, 3 Drawing Sheets

(56) References Cited

U.S. PATENT DOCUMENTS

| | | | |
|---|---|---|---|
| 6,581,443 B2 | 6/2003 | Abaev et al. | |
| 2005/0178185 A1* | 8/2005 | Negri | G01N 33/0031 73/23.34 |
| 2006/0239331 A1 | 10/2006 | Schwegman | |
| 2007/0251960 A1* | 11/2007 | Al-Misfer | C01B 17/0243 222/590 |
| 2014/0087587 A1* | 3/2014 | Lind | H01R 43/26 439/527 |
| 2014/0111996 A1* | 4/2014 | Yeh | F21S 8/035 362/249.03 |
| 2014/0144767 A1* | 5/2014 | Jost | B01D 3/02 203/2 |
| 2014/0228740 A1* | 8/2014 | Kiss | A61M 35/30 604/24 |
| 2015/0149617 A1* | 5/2015 | Lai | H04L 43/08 709/224 |
| 2015/0185093 A1 | 7/2015 | Kitzman et al. | |
| 2016/0136539 A1* | 5/2016 | Carl | B01D 1/222 202/175 |

FOREIGN PATENT DOCUMENTS

| | | |
|---|---|---|
| CN | 203763880 U | 8/2014 |
| CN | 204 214 564 U | 3/2015 |
| DE | 1281190 B | 10/1968 |
| DE | 1498555 A1 | 12/1968 |
| DE | 84 10 868 U1 | 8/1984 |
| DE | 37 09 739 A1 | 10/1988 |
| DE | 10 2011 055 613 A1 | 5/2012 |
| DE | 10 2015 005 265 A1 | 10/2016 |
| EP | 2 075 058 A1 | 7/2009 |
| EP | 1 967 269 B1 | 10/2011 |
| GB | 904960 A | 9/1962 |

* cited by examiner

SYSTEM AND ARRANGEMENT FOR AUTOMATIC DISTILLATION MEASUREMENTS

TECHNICAL FIELD

The present invention relates to an arrangement for closing a container for a liquid for determining evaporation properties of the liquid according to at least one standardized test and further relates to a liquid analysis system, in particular automatic distillation unit, for analyzing a liquid, in particular according to at least one standardized test.

TECHNOLOGICAL BACKGROUND

The present invention is within the field of the automatic (or atmospheric) distillation units (ADU) with which according to different norms (for example ASTM D86) the boiling behavior of liquid, in particular of petrol products or solvents, can be determined. Thereby, a standardized sample container, the so-called flask, is heated from below and the thereby generated distillate is led away via a condenser into a collecting container. The distillation behavior of the liquid is inter alia characterized using a temperature measurement.

For example, mineral oil products which have been obtained from mineral oil by fractionated distillation must be subjected for quality checks to standardized tests (for example according to the norms ASTM D975 and EN 590 for diesel oil and ASTM D4814 and EN 228 for gas or petrol). To obtain comparable test results, it is necessary to conduct tests according to the norm ASTM D86/ISO 3405, in order to control the refining process and to certify the end products.

Solvents are produced in refineries and petrol chemical plants and are utilized for example for dispersing pigments for color. In order to determine the distillation properties of solvents with a relatively broad boiling range, such as gasoline, ASTM D86 is applied. In order to determine the purity of solvent, inter alia ASTM D850 for organic liquids and ASTM D1078 for aromatic carbohydrates are utilized.

U.S. Pat. No. 6,581,443 B2 discloses a process for determining the distillation characteristics of liquid mineral oil products. A sample is heated in a distillation container while the temperature of the sample in the liquid phase as well as in the vapor phase is measured. Further, the pressure in the vapor phase of the sample is continuously measured during the course of the distillation.

CN 203763880 U discloses a vacuum distillation unit with a distillation container, a first rubber plug, a thermometer, which is installed at the first rubber plug and which extends into the distillation container, a second rubber plug, a capillary glass tube which is installed at the second rubber plug and which extends into the installation container. An end of a thermometer extends into the distillation container and an end of the capillary glass tube extends into the distillation container close to a sidewall.

CN 202315368 U discloses a negative pressure stripping device which comprises a distillation container, a heating chain as well as a thermometer, which is inserted at a rubber plug. The pressure inside the distillation container may be decreased in order to avoid explosion of the reception container.

GB 904960 A discloses an apparatus for usage in the control of a distillation and for determining the distillation characteristic of a liquid mixture, such as mineral oil. A container is equipped with an electric heater and with a thermocouple element. The temperature measured with the thermocouple element is recorded as a temperature time graph.

DE 1498555 A1 discloses a distillation automat for time-dependent measurement and recording of boiling temperatures of liquid samples. A thermocouple element is localized at a bottom of the container, in order to allow determination of a peak value of the temperature at the end point of the distillation. Further, a thermocouple element is in connection with a writer for recording the vapor temperature.

According to the prior art, a distillation container or flask is closed using a plug, through which one or two temperature measurement elements are guided. For example, a Pt100-temperature sensor may be guided through the plug, in order to measure in the upper region of the flask the vapor temperature of the sample to be analyzed. Further, a dry point sensor may also be guided through the plug until its lower tip touches the bottom of the flask. This second temperature sensor may recognize the point in time, at which the last residue of the sample is evaporated from the bottom of the container.

According to the prior art, a user of the apparatus has to manually insert the temperature sensor through the plug and has to connect cables at an evaluation device. Further, before start of the measurement, the sensors have to be calibrated. These working steps are prone to errors are cumbersome and may lead to erroneous measurements.

SUMMARY

There may be a need to provide a secure handling of the flask including the plug and further to simplify the handling of the temperature sensors. There may also be a need to improve the reliability and safety of the measurement as well as to improve the component employed for the measurement, in particular to achieve a reliable mechanical support of the container.

Embodiments of an improved arrangement close a container such as a flask for holding a liquid for determining evaporation properties of the liquid therein according to at least one standardized test. The arrangement includes a temperature measurement system that measures a vapor temperature of the liquid, a sensor with a lower end, a closing part with a through opening through which a portion of the temperature measurement sensor is guided such that the lower end of the sensor is arranged in the container. An adjustment mechanism positions the lower end of the sensor along a longitudinal direction of the temperature measurement sensor.

A liquid analysis system for analyzing a liquid according to at least one standard test includes a container with an opening and an arrangement for closing the container where the arrangement includes a temperature measurement system with a sensor having a lower end, a closing part with an outer surface adapted to contact an inner surface of an opening in the container and having a through-opening through which a portion of the sensor is guided such that the lower end of the sensor is arranged within the container and a mechanism for adjusting a position of the lower end of the sensor along a longitudinal direction of the sensor.

OVERVIEW OF EMBODIMENTS

The adjustment mechanism may include a screw according to alternative embodiments, the mechanism for adjusting a position of the lower end of the temperature measurement sensor along a longitudinal direction may comprise a combination of a rack rail and a gear wheel. In a further, alternative embodiment, the mechanism may include a combination of a lever and a push rod.

According to accurately prescribed guidelines in the applicable standard test, and according to embodiments of the present invention, a predetermined volume of a sample is filled into the sample container (for example a flask) and the sample container is closed with the arrangement for closing. The sample is then heated under defined conditions, so that portions of the sample evaporate. The vapor is cooled within a condenser line and the condensate is collected in a cylinder. During the performance of the test, the temperature of the vapor is recorded using the temperature measurement system and also the time is recorded. As results of a standardized automatic distillation test, for example the following parameters may be obtained:

initial boiling point, i.e. the temperature, at which the first droplet of the distillate falls into the collection cylinder end boiling point, i.e. the maximal temperature during the distillation the total volume of the distillate collected in the reception cylinder the rest of the sample remaining within the distillation container the dry point, i.e. the temperature, at which the last droplet of the distillate evaporates from the bottom of the container distillation curve.

The distillation curve can be obtained in that the temperature is drawn against the relative recovery volume in the reception cylinder. From the distillation curve, for example, the boiling range of the sample can be derived as the difference between the maximal temperature and the minimal temperature.

In particular, embodiments of the present invention are suitable for carrying out standard tests for the distillation of petrol products, such as for example ASTM D86 (groups 0 to 4), ISO3405, IP123, BS2000-123, respectively, in the version valid at the priority date. Embodiments of the present invention are further suited to carry out standard tests for the distillation of solvent, such as ASTM D1078, IP 95, BS2000-195, ASTM D850. As results of the performance of the tests, a respective distillation curve of the examined sample as well as for example the dry point can be obtained. The above-mentioned tests are at least performable according to the respective versions of the standard tests which are valid at the priority date.

Embodiments of the present invention may for example support a standardized examination of a sample having a boiling range between for example 20° C. and 400° C. In particular, the standards ASTM D86, ASTM D850, ASTM D1078 may be supported, as well as ISO 3405, IP 123, IP 195, respectively, in the version valid at the priority date. The specifications of these standard tests may for example be obtained from ASTM (for example www.ASTM.org). According to embodiments of the present invention, a vapor temperature range from 0° C. to 450° C., a condenser temperature range from 0° C. to 80° C. and a chamber temperature range from 0° C. to 50° C. can be supported. Further, an atmospheric pressure sensor may be included in embodiments which enable to automatically correct the result to standard pressure.

In particular, embodiments of the present invention are designed for characterizing petrol products, in particular different from desalting arrangements for seawater, equipment for drinking water preparation, purification plants for wastewater, chemical equipment for the treatment of carbohydrates, rotation evaporators, distillation equipment for the processing of biological material. In particular, embodiments of the present invention provide a standardized distillation equipment, in particular an automatic distillation equipment under atmospheric pressure for liquid samples, in particular for samples of mineral oil products, wherein the measurement of the distillation parameters is carried out according to a predefined test standard which is selected from a plurality of possible standards from which above some examples were given. In an alternative embodiment, a standardized distillation device for measurement of distillation parameters under reduced pressure or under vacuum may be provided.

The flask may be in particular a glass flask, in particular an essentially round flask. In particular, below the opening of the flask or the container, an outlet, such as a glass tube, may lead to a condenser unit. In particular, the container, further in particular the flask, may be one out of a group of standardized containers which are compatible with the standardized tests for characterizing of evaporation properties of sample, as is set forth in the examples above.

The liquid may for example be a mineral oil product, for example gas (petrol), diesel, kerosene or the like, or may comprise a solvent, for example for the color industry. The determining of evaporation properties may for example comprise an evaporation curve or the quantities exemplarily listed above as results. The standardized test may include one of the above-mentioned tests.

The temperature measurement system may comprise beside the one temperature measurement sensor further one or more further temperature measurement sensors, which may for example carry out temperature measurements at different positions within the container, for example within the gas phase of the liquid or within the liquid phase of the liquid.

In particular, the temperature measurement sensor may, using the screw mechanism, be adjusted in the (for example vertical) position such that the temperature measurement sensor measures the vapor temperature of the partially evaporated liquid immediately before entry of the vapor into the condenser branch. In order to allow in particular accurately adjusting this position, the screw mechanism is provided. The temperature measurement sensor may for example be configured to measure the temperature via the change of a resistance value of a measurement resistor in dependence of the temperature. The temperature measurement sensor may for example be or comprise a Pt100-measurement sensor. Alternatively, the temperature measurement sensor may comprise other temperature sensors.

The resistance-based temperature measurement sensor may for example be embedded into glass or into metal. The embedding into metal may decrease a response time of the temperature measurement sensor, to thereby improve the measurement.

The closing part is adapted for (for example in a particular temperature range and pressure range, vapor-tight) closing the opening of the container. For this purpose, an in particular conically shaped outer surface of the closing part contacts a (for example ground-in) inner (glass) surface of the opening wall of the container. During the reached temperatures and pressures according to the test, the closing part closes the container vapor-tight so that no vapor may exit through the opening of the container out of the container.

The closing part comprises at least one through-opening, i.e. an opening which completely reaches through the closing part so that the through-opening comprises an opening towards the lower front face of the closing part as well as an opening at an upper front face of the closing part.

A portion of the temperature measurement sensor is entirely surrounded by a (inner) surface of the closing part limiting the through-opening, in particular is vapor-tightly surrounded, optionally using one or more sealing rings. The closing part may for example comprise substantially cylinder symmetry and may comprise for example a cone-shaped outer surface for contacting a cone-shaped (inner) surface of the opening wall of the container. A cylinder symmetry axis may for example run exactly through the through-opening. In other embodiments, the through-opening may be offset or shifted but parallel to the cylinder symmetry axis of the outer surface of the closing part. The closing part may be manufactured from a material which withstands a high vapor temperature, such as 450° C.

Another portion of the temperature measurement sensor may be arranged within the container, when the arrangement for closing including the closing part is put onto the container.

According to the prior art, a temperature measurement sensor was positioned within the container, in that it was manually guided through a closing plug or a closing part and was manually shifted, by exerting drag or pressure. According to the present invention it is not necessary to directly (without any mediator) apply pressure or apply drag to the temperature measurement sensor, but the temperature measurement sensor may, using a screwing motion (for example actuating the screw mechanism), be changed in its (vertical) position. Thereby, a handling, in particular an adjustment of a position defined for the standardized test of the lower end of the temperature measurement sensor may be simplified for the user. In particular, by embodiments of the present invention, the requirement is avoided that the user inserts the temperature sensor manually through the plug.

According to an embodiment of the invention, the temperature measurement sensor is already guided through the through-opening before closing the container. Merely the adjustment of the vertical position of the lower end of the temperature measurement sensor by actuating the screw mechanism may be required, in order to achieve a configuration according to a standardized test. The screw mechanism may include at least one internal thread and an external thread. By turning the internal thread relative to the external thread, the (vertical) position of the lower end of the temperature measurement sensor (along the longitudinal direction) can be changed. A screw motion is easily carried out by a user. The screw mechanism may enable to change the (vertical) position in two directions, for example upwards and downwards.

According to an embodiment of the present invention, by actuating the mechanism, in particular the screw mechanism, the position of the lower end of the temperature measurement sensor is changeable along the longitudinal direction of the temperature measurement sensor. The actuation of the screw mechanism may include a relative screwing of an internal thread relative to an external thread. The actuation element of the screw mechanism may be accessible to a user from the outside, such as from an upper side of the arrangement for closing the container, when the container is closed by the arrangement for closing.

The adjustment of the position of the lower end of the temperature measurement sensor along the longitudinal direction of the bar or rod may for example be enabled and/or restricted to a range of between 0 mm and 5 mm, in particular 0 mm to 3 mm. The utilized container may comprise manufacturing tolerances with respect to a length of a neck or opening wall or with regard to a vertical distance from an upper end of the opening wall to the position of a junction to a condenser branch. In order to, in spite of the manufacturing tolerances, achieve a defined positioning of the temperature measurement sensor according to the standardized test (for example in the height of the junction to the condenser branch), the temperature measurement sensor may advantageously be adjusted in the above-mentioned region which is sufficiently broad, to compensate for expected manufacturing tolerances in particular of the container. When the adjustability of the position is restricted to the above-defined region, the arrangement may advantageously be kept relatively small in its dimension so that in particular no portion of the temperature measurement sensor protrudes beyond an upper outer surface of the arrangement for closing the container. Thereby, the handling may be simplified and the arrangement may be kept compact.

According to an embodiment of the present invention, the mechanism for adjusting the position of the lower end of the temperature measurement sensor along the longitudinal direction of the temperature measurement sensor comprises a screw mechanism.

According to an embodiment of the present invention, the screw mechanism comprises a screw element having a screw thread, wherein by turning the screw element about a screwing axis, the position of the lower end of the temperature measurement sensor is adjustable. The adjustment of the position of the lower end of the temperature measurement sensor is carried out in particular in vertical or approximately vertical direction. The screwing axis may in particular coincide with the, if present, cylinder symmetry axis (of the closing part) or may be parallel thereto. The screw thread may include an internal thread and an external thread. Thereby, the adjustability may be implemented using conventionally available mechanical elements and a handling may be simplified.

According to an embodiment of the present invention, the arrangement further comprises a central part having an inner space, in particular above the closing part, wherein in the inner space, an upper end of the temperature measurement sensor is arranged. The central part may for example comprise a housing, wherein within the inner space, different further components may be arranged. When in the inner space an upper end of the temperature measurement sensor is arranged, it may be avoided, that the temperature measurement sensor protrudes above the arrangement for closing. An upper end of the temperature measurement sensor may be entirely buried within the arrangement for closing, thus to be also not obstructive in the external space. Within the inner part, for example one or more electronic and/or mechanical components may be arranged, in order to support the positioning and/or supporting of at least one temperature measurement sensor and/or to support a supply with electric energy to the temperature measurement sensor or with control signals and/or to support an output of measurement data from the temperature measurement sensor. Thus, the arrangement for closing may not only satisfy the function of closing the container, but may further advantageously support the temperature measurement at one or more defined positions.

According to an embodiment of the present invention, the arrangement further comprises a cap (or cover or upper housing portion) for closing the inner space (which is provided within the central part). The central part may be arranged between the closing part and the cap. The cap may be provided for protection of components within the inner space as well as in other embodiments additionally or alternatively may also be part of the screw mechanism.

According to an embodiment of the present invention, the cap comprises an inner thread configured as through-hole or blind hole. Thereby, different possibilities of realizing the screw mechanism are given. A thread axis or screwing axis of the internal thread may for example coincide with the, if present, cylinder symmetry axis or may be parallel thereto.

According to an embodiment of the present invention, the cap forms the screw element, wherein an upper end of the temperature measurement having an external thread is screwed into the internal thread of the cap. The cap may be supported relative to the central part so that upon turning the cap or upon twisting the cap, the vertical position of the cap is not changed relative to the central part, however, by twisting or turning the cap, the temperature measurement sensor is moved upwards or downwards, upon screwing the external thread of the temperature measurement sensor into the internal thread of the cap. The internal thread of the cap may be integrally formed with the entire cap or may be formed as an inset part manufactured from a material which is different from residual material of the cap, such as metal. When the cap forms the screw element, further indentations or protrusions may be provided at the cap, for example to allow engagement by one or more fingers, to facilitate the turning or twisting of the cap.

According to an embodiment of the present invention, the screw element is configured as a (adjustment) screw having an external thread, wherein the internal thread is configured in the cap as through-thread, into which the adjustment screw is screwed in, in order to contact a front surface of an upper end of the temperature measurement sensor which is pre-tensioned upwards. The adjustment screw (in particular its grip portion) may protrude upwards above an upper surface of the cap, to allow a user turning the adjustment screw. In the region protruding beyond the cap, the screw may comprise a handy outer surface, for example with marks parallel to the screwing axis in an outer surface of a portion of the adjustment screw.

By screwing the adjustment screw into the through-thread of the cap, a lower front surface of the adjustment screw may move the front surface of the upper end of the temperature measurement sensor, pre-tensioned upwards, downwards (i.e. along the direction of the temperature measurement sensor downwards). Thereby, also the vertical position of the lower end of the temperature measurement sensor is changed or moved downwards. When the adjustment screw is screwed out in an opposite screwing direction in a direction upwards out of the through-thread, wherein, however, other sections of the external thread of the screw remain within the screw thread of the cap, the temperature measurement sensor moves due to the pretension of the temperature measurement sensor upwards, in order to thus change the vertical position of the lower end of the temperature measurement sensor in a direction upwards. An upper grip portion of the screw arranged above the cap may for example be configured such that the grip portion is easily twistable by two human fingers, for example the thumb and the index finger.

According to an embodiment of the present invention, the pretension (of the temperature measurement sensor upwards) is generated by a spiral spring through which the temperature measurement sensor is guided and which is supported in a lower end in the central part (for example housing portion) and at an upper end at a bulge of the temperature measurement sensor (or is clamped therebetween), in order to pretension it upwards. The spiral spring may entirely be arranged inside the inner space of the central part so that its longitudinal axis coincides with the longitudinal axis of the temperature measurement sensor, wherein the longitudinal axis of the temperature measurement sensor in particular may coincide with a (if present) cylinder rotation symmetry axis of the closing part and/or of the through-opening of the closing part or may be parallel thereto.

The upper end of the temperature measurement sensor may be arranged within the inner space of the central part, and namely for all possible adjustments of the (vertical) position of the lower end of the temperature measurement sensor. The adjustment screw may, depending on the adjustment, extend more or less (from above) into the inner space. The internal thread of the cap may be formed integrally with the cap or may be formed as an element that comprises other materials than remaining material of the cap. In particular, the inner through-thread may be formed by a metal sleeve which is provided in the cap.

According to an embodiment of the present invention, the arrangement further comprises an, in particular arranged in the inner space of the central part, electronic circuit, in particular on a conductor board, which is adapted to process measurement data output by the temperature measurement sensor, in particular to convert them into digital signals. When the (in particular analog) measurement data output by the temperature measurement sensor are converted into digital signals, a further transmission to an evaluation device external to the arrangement for closing the container may be carried out in a more reliable manner. In conventional arrangements, analog measurement data are transmitted from the temperature measurement sensor to an external unit which may involve transmission faults. The transmission of digital signals may be carried out in a more reliable manner.

According to an embodiment of the present invention, the electronic circuit comprises an electronic storage with calibration data for the temperature measurement sensor; and/or a A-D-transducer; and/or a communication module, which is adapted to transmit digital signals wirelessly or wire-based; and/or a reference resistor with reference to which a temperature-dependent resistance of the temperature measurement sensor (in particular Pt100, further in particular metal Pt100) is determined. Thereby, a calibration of the temperature measurement sensor and also of further temperature measurement sensors, if present, may be carried out within the arrangement itself by processing the measurement data, without requiring the calibration using a further device external to the arrangement. The A-D-transducer may be adapted to convert analog data into digital data. The communication module may support conventional communication protocols, such as Ethernet, USB or others. A wireless transmission may be carried out using radio waves. The reference resistor may comprise a defined resistance value, in order to compare this resistance value with a resistance value which has been determined for the temperature-dependent resistor of the temperature measurement sensor. The calibration data may for example comprise one or more characteristic curves which indicate the resistance value of the temperature measurement sensor in dependence of the temperature, for example in form of a table, a graph or a mathematical relationship. In particular, the temperature measurement sensor may comprise a platinum-resistor measurement sensor, such as Pt100. The measurement platinum wire may for example be embedded into metal (metal-Pt100), in order to reduce a response time of the temperature measurement sensor. Thereby, an arrangement with a specific temperature measurement sensor including the specifically therefore determined and stored calibration data may be provided.

According to an embodiment of the present invention, the temperature measurement system comprises a further temperature measurement sensor (or in particular even further temperature measurement sensors), in particular a thermocouple element, which is guided through the closing part and which is adapted to measure a temperature at the bottom of the container using its lower end. The further temperature measurement sensor may be longer than the first temperature measurement sensor. The further temperature measurement sensor may advantageously be guided through a further through-opening within the closing part. The thermocouple element may comprise a pair of metallic conductors from different materials which are connected at one end and which are, due to the thermoelectric effect, suitable for temperature measurement. A thermally dependent voltage may evolve due to a temperature difference between the measurement location (at the bottom of the container) and a comparison location. The comparison location may for example be arranged within the inner space and/or may for example amount to room temperature.

The further temperature measurement sensor may be adjustable in its position and may via a further pretension spring, in particular a spiral spring, pretensioned downwards, wherein the further pretension spring in particular presses downwards a further conductor board, at which the further temperature measurement sensor is attached. Thereby, it may be ensured that the lower end of the further temperature measurement sensor reliably touches the bottom of the container, for example in order to effectively allow determining the dry point.

According to an embodiment of the present invention the arrangement is adapted such that the central part surrounds and/or receives at least an upper portion of the closing part and comprises in particular an elastic snap ring, in order to latch below an outwards protruding bulge of an outer opening wall of the opening of the container, when the closing part is entirely inserted into the opening of the container.

The snap ring may enforce a mechanical rigidity of the (reversible) connection between the arrangement and the container. While the closing part is in contact with the inner surface of the opening wall limiting the opening of the container, the snap ring may be in contact with an outer surface of the opening wall of the container (upon inwards directed pretension), in particular arranged below an (outer) bulge at the upper end of the opening wall of the container. The snap ring may be pressed together by its own elastic force at its open ends. The snap ring therefore may thus encompass an outer surface of the opening wall so that a displacement of the snap ring upwards (beyond the outwards protruding bulge of the outer opening wall) is prohibited or impeded. Thereby, a rigid (but reversible) connection between the arrangement for closing and the container may be achieved.

According to an embodiment of the present invention, the arrangement further comprises an in particular cylinder symmetric support portion which is arranged above the closing part, in particular arranged at the central part, and which protrudes transverse to the longitudinal direction of the temperature measurement sensor beyond the closing part and/or the central part, which support part is slidable into each other with a counterpart of an auxiliary equipment (in particular latchable, for example using form-fit and/or force-fit), wherein the support part or the counterpart is configured as a plug element (for example a male element) and the support part or the counterpart is configured as sleeve-shaped (for example female) element.

The support section may be utilized in order to hold or support the arrangement including the container (in particular in order to solely carry them, without any further support), in particular during a standardized test for examining a sample. The support section may for example protrude from the central part along a direction which is aligned between 90° and 45° relative to the longitudinal direction of the temperature measurement sensor. The support section may thus for example protrude slightly downwards (relative to a horizontal direction) from the central part. When the support section protrudes for example inclined downwards from the central part, a holding force may be achieved in a vertical direction as well as in a horizontal direction, in order to ensure a reliable safe holding. It may prevail an at least approximated cylinder symmetry of the support section with respect to a symmetry axis which lies transverse to the longitudinal axis of the temperature measurement sensor (of the temperature measurement system), for example in a range of 90° to 45° in relation to the longitudinal direction of the temperature measurement sensor. In other embodiments, the support section does not comprise a cylinder symmetry but has for example a rectangular or quadratic cross-section so that the support section can be received in the counterpart only in a defined azimuthal orientation or may be coupled with the counterpart only in a defined azimuthal orientation. Thereby, an effective holding or attachment in a defined orientation of the arrangement for closing including the container may be achieved.

The support section may for example be slid into a counterpart or the support section may at least partly encompass or surround a counterpart after sliding into each other. Portions of the support section may be formed geometrically complementary to portions of the counterpart. After sliding into each other the support section and the counterpart, the support section and thus also the entire arrangement for closing the container may be hold in a form-fit at the counterpart.

According to an embodiment of the present invention, the support section comprises magnetizable and/or magnetic material. Similarly, the counterpart may comprise magnetizable and/or magnetic material, in order to allow a magnetic coupling between the support section and the counterpart. Different adaptations of magnet locks may be provided between the counterpart and the support section.

According to an embodiment of the present invention, the arrangement further comprises a plug and/or a socket, in order to, in particular via an electric cable, enable an electric connection of the electronic circuit to outwards.

When a plug or a socket is present, a bulky or unhandily long cable can be avoided. The plug or the socket may be integrated with the support section, i.e. may be part of it. In other embodiments, the plug and/or socket is separately from the support section formed at the end of a connection cable, in particular comprising a magnetic plug and/or a magnetic socket. When the plug and/or the socket is integrated with the support section, by sliding into each other the counterpart and the support section, a mechanical, in particular form-fit connection may be achieved as well as an electrical connection, when the plug or the socket couples with a corresponding counterpart socket or counterpart plug in the counterpart. Thus, merely a single hand movement, namely a sliding into each other the support section and the counterpart may suffice, to achieve a mechanical attachment as well as an electrical connection of the arrangement, in particular including the container. Thereby, handling is substantially simplified.

The closing part (for example the plug) may be manufactured from Teflon and/or the central part may be manufactured from nylon. Alternatively, the plug may also be manufactured from PEEK (polyetheretherketone) or PEI (polyetherimide). Other materials are also possible.

The arrangement may further comprise at least one (for example rubber) seal, which is provided between the temperature measurement sensor and a surface in the closing part limiting the through-opening. Thereby, it may be avoided that vapor leaks outwards through a (possible) gap between the temperature measurement sensor and a surface limiting the through-opening or leaks into the inner space. The seal may for example include one or more O-rings. The one or the more O-rings may for example be slid over the temperature measurement sensor.

According to an embodiment of the present invention, a liquid analysis system, in particular automatic distillation unit for analyzing a liquid, in particular according to at least one standardized test, is provided, comprising: a container, in particular having an outlet or branching leading to a condenser; and an arrangement for closing a container according to one of the preceding embodiments. Thereby, a system for analyzing for example mineral oil products or solvents according to standardized tests is provided.

According to an embodiment of the present invention, the liquid analysis system further comprises: a support receptor, which is adapted to receive a support part of the arrangement; and/or a heater, which is arranged to heat the container from below; and/or a control system, which is adapted to control the heater and/or to receive measurement data from the temperature measurement system and to evaluate those, in particular according to a standardized test.

DETAILED DESCRIPTION OF ILLUSTRATED EMBODIMENTS

It should be understood that elements which are equal or similar in structural and/or function are labelled in the figures of the different embodiments with reference signs which differ merely in the first digit.

Figure 1:
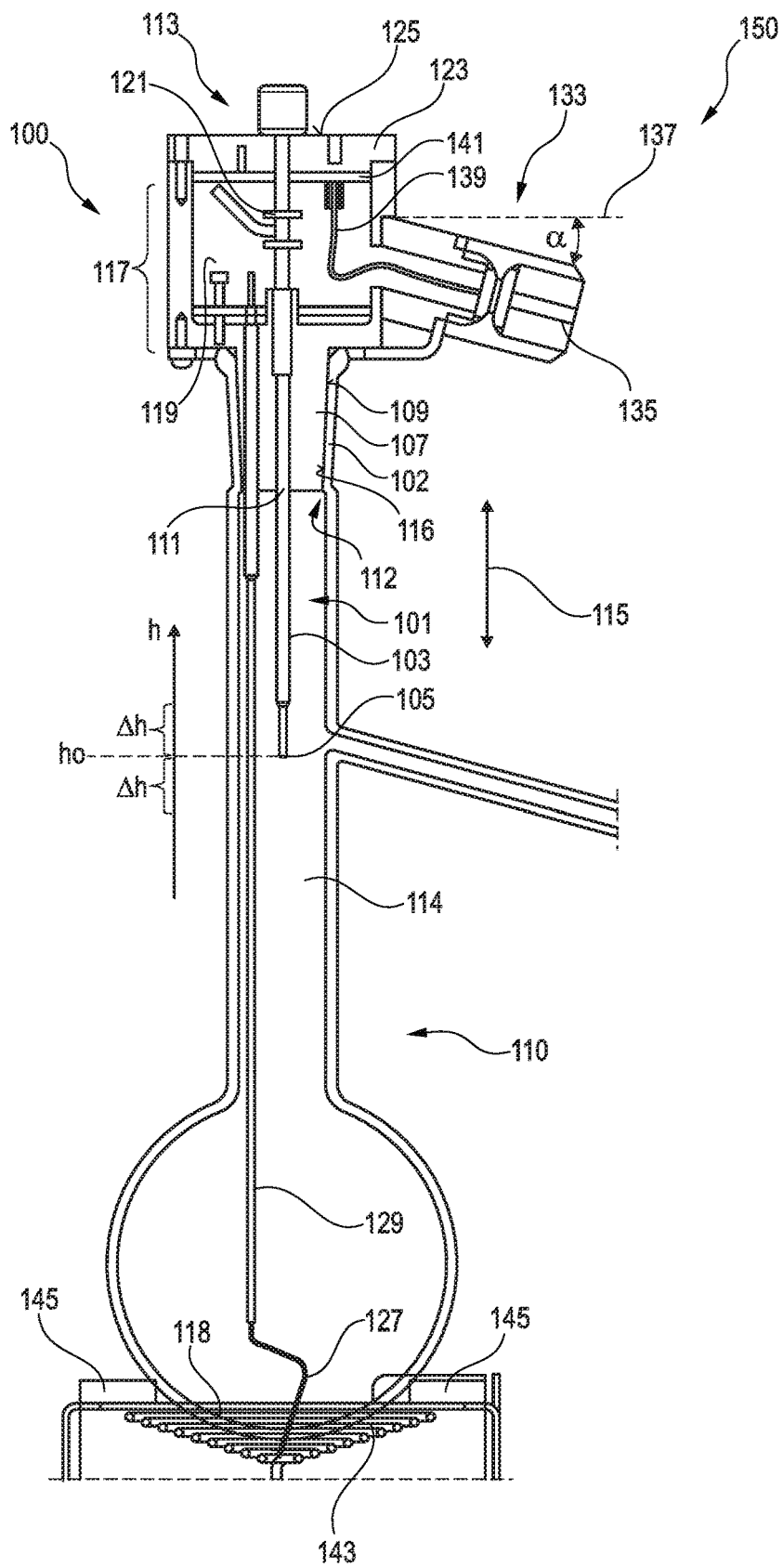
FIG. 1 illustrates in a schematic sectional view a liquid analysis system having an arrangement for closing a container according to an embodiment of the present invention together with the container.

FIG. 1 illustrates in a schematic sectional view a liquid analysis system 150 according to an embodiment of the present invention which includes an arrangement 100 for closing a container 110 according to an embodiment of the present invention. The liquid analysis system 150 thereby includes the container 110, which is configured as glass round flask, as well as the arrangement 100.

The arrangement 100 is put onto an opening 112 of the container 110, in order to close it vapor-tight. The arrangement 100 comprises at least one temperature measurement system 101 which is adapted for measuring a vapor temperature of the fluid within the gas space 114 of the container 110. The temperature measurement system 101 thereby includes a temperature measurement sensor 103 having an (lower) end 105 which may in particular be configured as a Pt100, in particular metal-Pt100. The temperature measurement system 101 includes further elements which will be described with reference to the following figures, in particular measurement electronics, electronic storage with calibration data, etc.

The arrangement 100 further comprises a closing part 107 having an in particular conically shaped outer surface 109 which is adapted for contacting an inner surface 116 of the opening wall 102 of the opening 112 of the container 110 for vapor-tightly closing the container 110. The closing part 107 comprises a through-opening 111 through which a portion of the temperature measurement sensor 103 is led such that the lower end 105 of the temperature measurement sensor 103 is arranged within the container, in particular within the vapour space 114.

The arrangement 100 further comprises a screw mechanism 113 for adjusting a vertical position h along a longitudinal direction 115 of the temperature measurement sensor 103. In the illustrated example, the lower end 105 of the temperature measurement sensor 103 is positioned in a position h0, by actuating the screw mechanism 113 it can be adjusted in a range ±Δh, for example ±5 mm. The screw mechanism will be explained in different embodiments with reference to FIGS. 2 and 3.

The arrangement 100 for closing further comprises a central part 117 with an inner space 119 above the closing part 107, wherein in the inner space 119 an upper end 121 of the temperature measurement sensor 103 is arranged. The inner space 119 is closed with a cap 123 so that the temperature measurement sensor 103 does not protrude beyond an upper end face 125 of the cap 123. The arrangement 100 or the temperature measurement sensor 101 includes in the illustrated embodiment a further temperature measurement sensor 129 which is in particular formed as a thermocouple element, which is guided through the closing part 107 and which is adapted to measure a temperature at a bottom 118 of the container 110 with its lower end 127. In the embodiment illustrated in FIG. 1, the lower end 127 of the further temperature measurement sensor 129 is downwards pretensioned via a further pretension spring (as is designated in FIG. 2 with reference sign 231), so that the lower end 127 of the further temperature measurement sensor 129 is pressed against the bottom 118 of the container 110.

The arrangement 100 further comprises a support section 133, in particular arranged at the central part 117 and connected thereto, which laterally protrudes transverse to the longitudinal direction 115 of the temperature measurement sensor 103 beyond the closing part 107 and/or the central part 117 which support section is slidable into each other with a (in FIG. 1 not illustrated) counterpart of an auxiliary equipment. In the embodiment illustrated in FIG. 1, the support section is formed as a plug element (male element), may however also be formed as a sleeve element (female element). The support section 133 is inclined by an angle a (for example between 0° and 45°) away from the horizontal 137, in order to allow a reliable attachment of the arrangement 100 including the container 110 in the vertical direction as well as in the horizontal direction.

The support section comprises an (therein integrated) electric plug 135 in order to allow via an electric cable an electric connection of an electronic circuit outwards which is received within the inner space 119. In other embodiments, instead of a plug 135 a socket is provided, in order to couple with a plug of an auxiliary equipment.

The plug 135 may be configured as multi-pole plug and a cable may be coupled thereon which cable 139 is guided into the inner space 119, in particular to a conductor board 141 which may include the electronic circuit.

The arrangement 150 further comprises a heater 143, which is arranged below the container 110 and below a perforated plate 145, in order to heat the container from below. The arrangement 150 may further comprise a control system (not shown), which is adapted to control the heater 143 and/or to receive and evaluate measurement data from the temperature measurement system 101.

Figure 2:
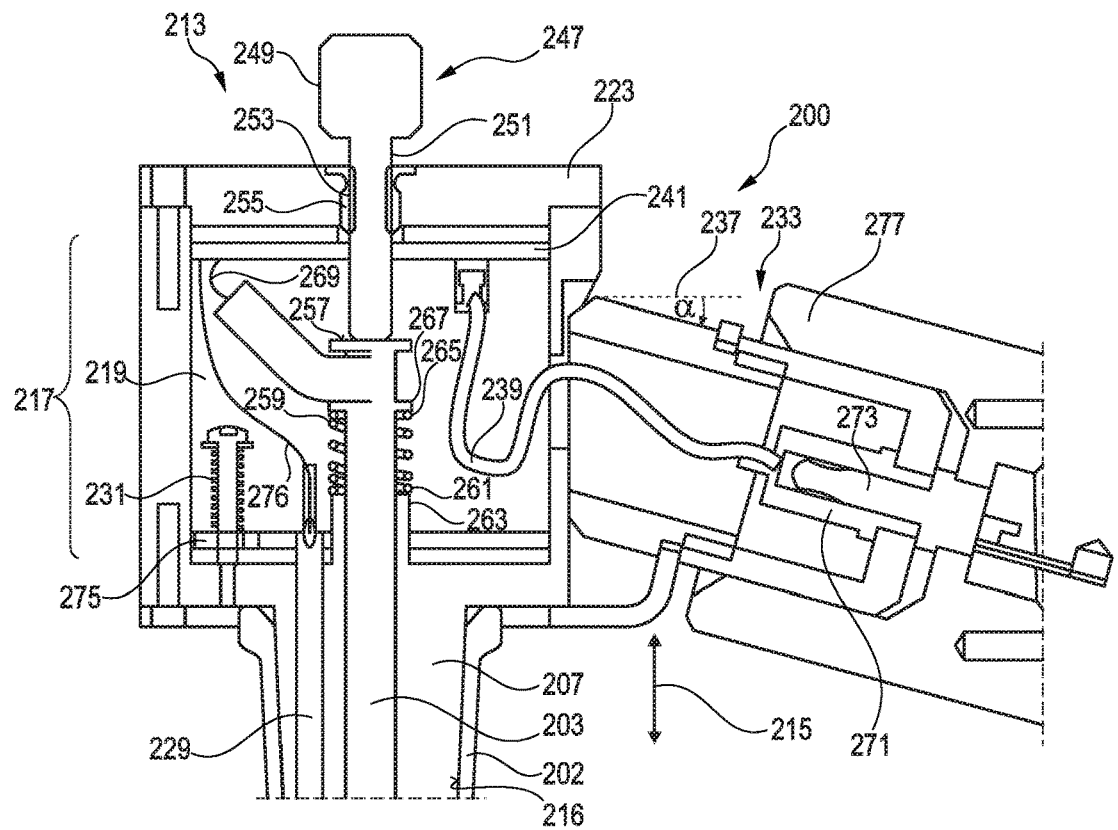
FIG. 2 illustrates a partial view of an arrangement for closing a container in a sectional view according to an embodiment of the present invention, held or supported by auxiliary equipment.

FIG. 2 illustrates in schematic sectional view a portion of an arrangement 200 for closing a container according to an embodiment of the present invention, wherein from the container merely an opening wall 202 having an inner surface 216 is illustrated. The arrangement 200 has some similarities to the arrangement 100 illustrated in FIG. 1 which are not described in detail again. In FIG. 2, the lower end of the temperature measurement sensor is not illustrated, it is located, however, as in the embodiment illustrated in FIG. 1, at the end of the temperature measurement sensor 203 so that by shifting or displacing the temperature measurement sensor 203 along the vertical direction 215, also the position of the lower end is changed.

The screw mechanism 213 for changing the position of the temperature measurement sensor 203 comprises a screw element (adjustment screw) 247 which comprises a grip section 249 and an external thread section 251. In the center of the cap 223, a through-going internal thread 253 is provided using a thread inset 255, wherein the internal thread 253 is designed as a through-internal thread. The external thread section 251 of the screw element 247 is screwed through the through-internal thread 253. A lower end of the screw element 247, for example a frontal side of the thread section 251, contacts a front surface 257 of the temperature measurement sensor 203 or an upper end of the temperature measurement sensor which is pretensioned upwards. The pretension of the temperature measurement sensor 203 upwards is achieved by a spiral spring 259, through which the rod 203 is guided and which is supported at a lower end 261 in the central part, in particular at a cornice 263 and which is supported at an upper end 265 at a bulge 267 of the temperature measurement sensor 203, in order to pretension it upwards.

The conductor board 241 within the inner space 219 of the central part 217 comprises an electronic circuit and receives via an electric line 269 measurement data from the sensitive region at a lower end of the temperature measurement sensor 203 and is adapted to process these measurement data, in particular to apply a calibration and/or to apply a conversion into digital signals. Digital signals may then via a cable 239 be supplied to a socket-outlet 271 into which a plug for example phone jack 273 of an evaluation unit can be plugged in, in order to transmit the digital data outwards.

Also, the embodiment 200 illustrated in FIG. 2 comprises a further temperature measurement sensor 229 having a (in FIG. 2 not illustrated) lower end which reaches up to the bottom of the container. This measurement sensor is pretensioned downwards by a spiral spring 231, wherein the further pretension spring 231 presses a further conductor board 275 downwards at which the further measurement sensor 229 is attached. Also, measurement data of the further temperature measurement sensor are transmitted via the cable 276 to the electronic circuit which is implemented on the conductor board 241.

Also, in FIG. 2, the support section 233 is configured as a plug element and is inserted into a sleeve-shaped counterpart 277, in order to achieve a form-fit connection. During the mechanical insertion of the support section 233 into the counterpart 277 simultaneously the electric connection socket 271 is electrically connected with the electric connection plug 273.

Figure 3:
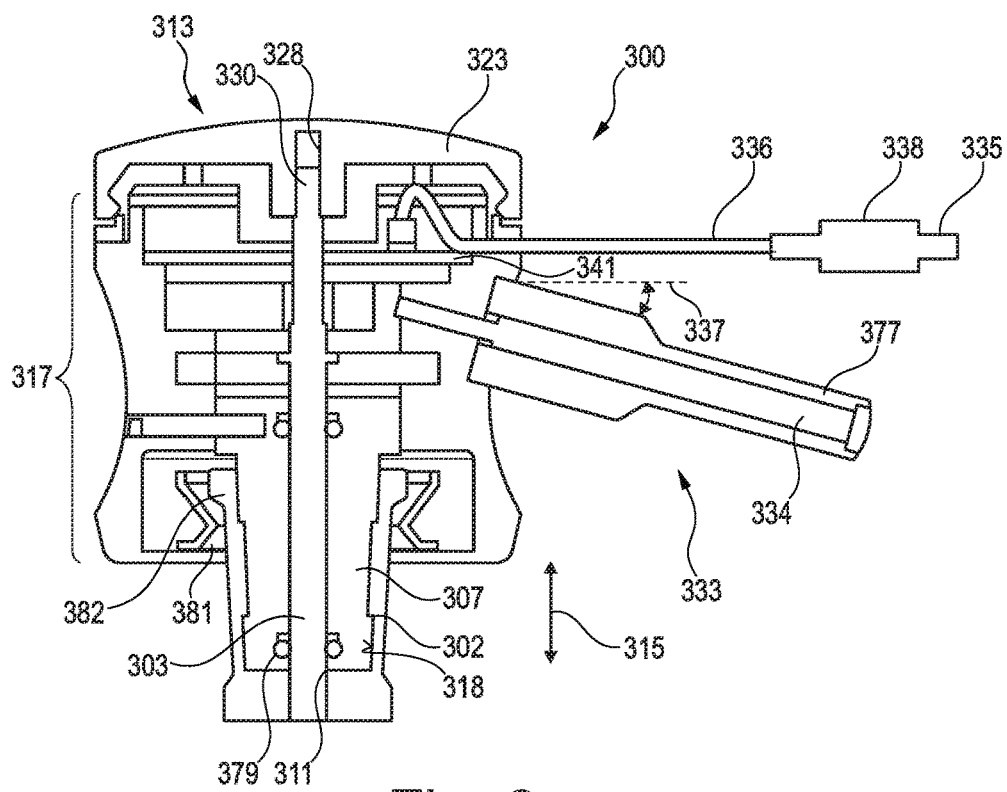
FIG. 3 illustrates in a schematic sectional view an arrangement for closing a container according to an embodiment of the present invention.

In FIG. 3 in schematic sectional view, a portion of an arrangement 300 for closing of a container is illustrated in the state, where the only partly illustrated container is closed by inserting the closing element 307 into the opening of the container which is limited by the opening wall 302. The arrangement 300 illustrated in FIG. 3 comprises merely a single temperature measurement sensor 303. A further temperature measurement sensor is not illustrated, may however be present in other embodiments similar to FIGS. 1 and 2.

For sealing a possible gap between the outer surface of the measurement sensor 303 and an inner surface of the closing part 307 limiting the through-opening 310, seal 0-rings 379 are provided. As is illustrated in FIG. 3, the central part 317 encompasses at least an upper portion of the closing part 307. Further, an elastic snap ring 381 is provided, which latches below a bulge 382 of an outer opening wall 302 of the container protruding outwards, when the closing part 307 is entirely inserted into the opening of the container. By providing the snap ring 381, a detraction, in particular unintentional detraction of the arrangement 300 from the container is impeded.

The support part 333 includes a support rod 334 which is inserted into a counterpart 377 of an auxiliary equipment and which latches there, in order to achieve a mechanical attachment. Also, the support section 333 illustrated in FIG. 3 is inclined away from the horizontal by an angle downwards. The angle a of the inclination downwards may for example amount to between 0° and 45°. The horizontal 337 is thereby perpendicular to the vertical direction or longitudinal direction 315 of the temperature measurement sensor 303. The support part 333, however, does not include integrally an electric plug or an electric socket as in the embodiment illustrated in FIG. 2. Instead, an electric plug 335 is provided at the end of the electric cable 336 separate from the support part 333. In the magnet section 338, a magnetizable material or a magnet is provided, in order to achieve a coupling with a counter-magnet (not illustrated).

Also, the screw mechanism 313 of the embodiment 300 illustrated in FIG. 3 is different from the screw mechanism 113 or 213, which are illustrated in FIGS. 1 and 2. In the arrangement 300 illustrated in FIG. 3, an internal thread 328 (blind hole) is provided in the cap 323, into which an upper end 330 of the temperature measurement sensor 303 having an external thread is screwed in. By twisting the (in the central part 317 supported) cap 323, the temperature measurement sensor 303 is displaced along the vertical direction 315 so that also the temperature measurement element provided at its end is changed in its vertical position.

Figure 4:
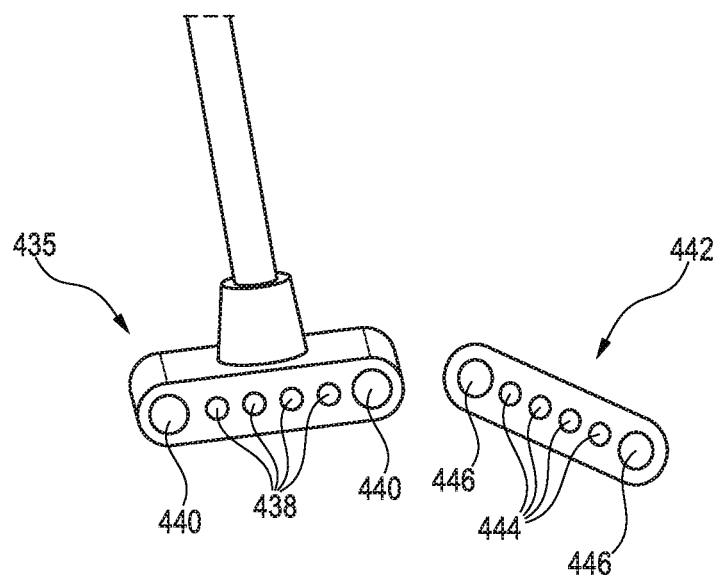
FIG. 4 illustrates perspective views of magnet connection elements, which may be utilized in embodiments of an arrangement for closing a container.

FIG. 4 exemplary illustrates an embodiment of a plug 435 which can for example be utilized as a realization of an electric plug 335 which is illustrated in FIG. 3. The (magnet) plug 435 comprises electric contacts 438, for example resilient gold spheres or gold-plated contacts 438 as well as magnets 440. In the counterpart 442, corresponding electric contact faces 444 and magnets or magnetizable material 446 are provided, wherein electric connections are formed between the terminals 438 and 444, as soon as the magnets 440 come into contact with the magnetized coupling elements 446 by magnetic forces.

Figure 5:
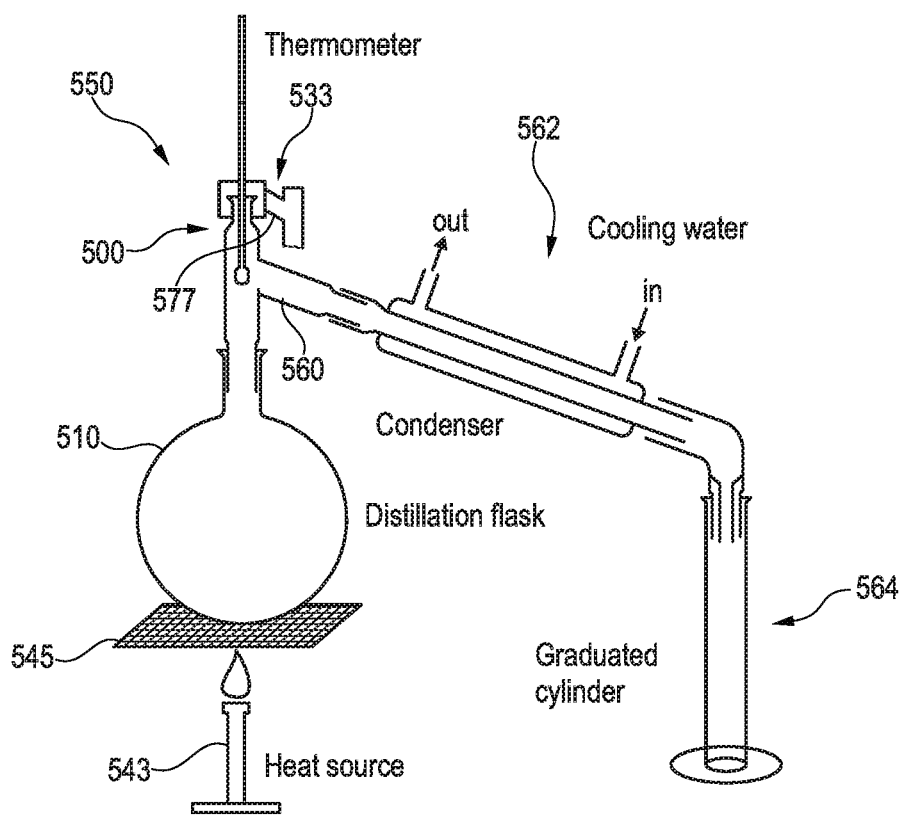
FIG. 5 illustrates in a schematic illustration a liquid analysis system according to an embodiment of the present invention.

FIG. 5 schematically illustrates a liquid analysis system 550 according to an embodiment of the present invention wherein an arrangement 500 for closing a container 510 may be similarly configured as is illustrated in FIG. 1, 2 or 3, because of which the arrangement is not further described or illustrated in detail. The support part 533 of the arrangement 500 for closing the container is, for holding the container, connected with a counterpart 577 which is attached at an auxiliary arrangement which is only partly illustrated. The container 510 includes further a branching 560 of a glass tube section leading to a condenser 562 in which the vapor is condensed. The condensate may later be collected into a cylinder 564. For determining the characteristic of the evaporation properties of a sample to be examined, also the liquid volume received in the cylinder 564 may be measured.

The arrangements 150, 550 illustrated in FIGS. 1, 5 may for example be adapted as automatic (or also atmospheric) distillation units (ADU), for example to examine mineral oil products or solvents. The containers 110, 510 may for example be standardized sample containers, the standardized tests may for example be conducted according to the norm ASTM D60, ASTM D850, ASTM D1078 or ISO 1078. Embodiments of the present invention allow a safe handling of the flask including the temperature measurement elements. Further, a support of the flask is enabled so that upon pressing the perforated plate or the heater the vapor pipe 560 of the flask is not damaged. Further, calibration data of at least one temperature sensor may be stored within the arrangement for closing, in particular in an electronic storage on a conductor board within the inner space of the central part. The arrangement for closing enables the adjustment of the height of at least one temperature sensor extending into the flask. Further, the arrangement is adapted to convert measurement data of at least one temperature sensor into digital data. Further, the serial number of at least one of the temperature sensor and/or the entire arrangement itself may be fixedly stored and/or it may be digitally communicated with the device. The temperature measurement of at least one of the temperature measurement sensor may have an accuracy of 0.1 K. The detection of the dry point using a further temperature sensor may be carried out using a thermocouple element, since it has a relatively small inertia and since a relatively high temperature of above 100° C. is expected. The thermocouple element may be resiliently supported. Thereby, a connection board may be resiliently mounted, on which the thermocouple element is attached. According to embodiments of the present invention, the arrangement for closing is formed as a unit consisting of the closing part including the temperature measurement system, so that the user has less assembly efforts and therefore the risk of damage is decreased. Calibration data and other configuration or processing data may be stored in an electronic storage (for example EEPROM or emulation within a microcontroller). Thereby, the calibration of the measurement element may be dispensed with. The calibration data does not necessarily have to be initially stored in the electronic storage but may also be recorded at a later stage by the user. The electronic storage may be configured that it is enabled to receive and store calibration data and configured to use these data for evaluation of measurement results.

Electronics or an electronic circuit which is implemented on the conductor board may acquire the measurement data from one or more measurement temperature sensors and may pre-process the data, in particular may convert them before transmission outwards into digital data. Thereby, a small susceptibility to trouble or a higher data safety may be enabled. In a further configuration, a further temperature measurement sensor for determining the temperature within the inner space may be provided in the central part, for example to enable monitoring of the functionality or proper functioning of the entire system or the temperature measurement sensor. The electric connection of the arrangement for closing the container outwards may be realized via a plug contact, for example a phone jack, and may for example comprise four contacts for voltage supply and communication.

The holder of the arrangement for closing the container in an auxiliary device may be realized via a holding pin which is magnetic and which is fixed by a magnet of the auxiliary arrangement. Via a magnetic plug having at least three contacts for voltage supply and communication an electric connection to the auxiliary equipment may be realized. Thereby, the magnetic plug may hang at a short cable so that upon inserting the plug (closing the container opening), the magnetic plug jumps without help into the corresponding socket.

Other embodiments of the present invention allow a wireless transmission of temperature measurement data. Also, wirelessly, an identification may be transmitted in order to identify the arrangement for closing the container and in particular to indicate, whether the arrangement has one or two or even more temperature measurement sensors. For a wireless transmission, a respective antenna may be provided within the arrangement for closing the container as well as in the auxiliary equipment. The arrangement may for example also be configured as a passive arrangement wherein energy supply may be implemented via wireless energy transmission. Furthermore, a driver circuit for enabling the communication via the antenna may be present. The communication may for example be realized using a RFID-protocol or using Bluetooth protocols.

It should be noted that the expression "having" (or "comprising") does not exclude other elements, and that the article "a" (or "an") does not exclude a plurality. Also, elements which are described in connection with different embodiment examples, may be combined.

The invention claimed is:

1. An arrangement for closing a container for a liquid for determining evaporation properties of the liquid according to at least one standardized test, comprising:
   at least one temperature measurement system, for measuring a vapor temperature of the liquid, having a temperature measurement sensor with a lower end;
   a closing part having an outer surface which is adapted for contacting a surface of an opening of the container for closing the container and having a through-opening through which a portion of the temperature measurement sensor is guided such that the lower end of the temperature measurement sensor is arranged within the container;
   a mechanism for adjusting a position of the lower end of the temperature measurement sensor along a longitudinal direction of the temperature measurement sensory; and
   a support part which is arranged above the closing part and which protrudes transverse to the longitudinal direction of the temperature measurement sensor beyond the closing part and a central part, which support part is slidable with respect to a counterpart of an auxiliary equipment, wherein the support part or the counterpart are configured as a plug element or wherein the support part or the counterpart is configured as a sleeve shaped element.

2. The arrangement according to claim 1, wherein the mechanism for adjusting a position of the lower end of the temperature measurement sensor along a longitudinal direction of the temperature measurement sensor includes a screw mechanism, wherein the screw mechanism comprises a screw element having a screw thread, wherein by turning the screw element about a screwing axis, the position of the temperature measurement sensor is adjustable.

3. The arrangement according to claim 2, further comprising:
the central part having an inner space, wherein within the inner space, an upper end of the temperature measurement sensor is arranged.

4. The arrangement according to claim 3, further comprising:
a cap for closing the inner space, wherein the central part is arranged between the closing part and the cap.

5. The arrangement according to claim 4, wherein the cap comprises an internal thread which is configured as a through-hole or a blind hole.

6. The arrangement according to claim 4, wherein the cap forms the screw element, wherein an upper end of the temperature measurement sensor with an external thread is screwed into the internal thread of the cap.

7. The arrangement according to claim 4, wherein the screw element is formed as a screw having an external thread, wherein the internal thread in the cap is configured as a through-thread, into which the screw is screwed in, to contact a front surface of an upper end of the temperature measurement sensor, wherein the front surface is pre-tensioned towards upwards.

8. The arrangement according to claim 7, wherein the pre-tensioning is generated by a spiral spring through which the temperature measurement sensor is guided and which is supported in a lower end in the central part and at an upper end at a bulge of the temperature measurement sensor, in order to pretension it towards upwards.

9. The arrangement according to claim 3, wherein the central part engages at least an upper portion of the closing part and comprises an elastic snap ring, in order to latch below an outwards protruding bulge of an outer opening wall of the opening of the container, when the closing part is completely inserted into the opening of the container.

10. The arrangement according to claim 1, further comprising:
an electronic circuit which is adapted to process measurement data output by the temperature measurement sensor and is adapted to convert the measurement data into digital signals, wherein the electronic circuit further comprises at least one of:
an electronic storage for or with calibration data for the temperature measurement sensor; and
a A-D transducer; and
a communication module which is adapted to transmit digital signals wirelessly or wire-based; and
a reference resistor, in relation to which a temperature-dependent resistance of the temperature measurement sensor is determined.

11. The arrangement according to claim 1, wherein the temperature measurement system comprises a further temperature measurement sensor which is guided through the closing part and which is adapted to measure with its lower end a temperature at the bottom of the container.

12. The arrangement according to claim 11, wherein the further temperature measurement sensor is characterized by one of:
is adjustable in the position; and
is pretensioned via a further pretension spring towards downwards, wherein the further pretension spring presses downwards a further conductor board, at which the further temperature measurement sensor is attached.

13. The arrangement according to claim 1, further comprising one of:
a plug and a socket, in order to allow an electric connection of an electronic circuit outwards.

14. The arrangement according to claim 13, wherein the plug or the socket is integrated with the support part.

15. The arrangement according to claim 13, wherein at least one of the plug and the socket are configured separate from the support part at the end of a connection cable.

16. The arrangement according to claim 1, wherein the closing part is manufactured from polytetrafluoroethylene and/or wherein the central part is manufactured from polyamide.

17. The arrangement according to claim 1, further comprising:
at least one seal which is provided between the temperature measurement sensor and a surface in the closing part limiting the through-opening.

18. A liquid analysis system for analyzing a liquid according to at least one standardized test, the system comprising:
a container having an opening; and
an arrangement for closing the container, the arrangement including at least one temperature measurement system for measuring a vapor temperature of the liquid and having a temperature measurement sensor with a lower end;
a closing part having an outer surface which is adapted for contacting a surface of an opening of the container for closing the container and having a through-opening through which a portion of the temperature measurement sensor is guided such that the lower end of the temperature measurement sensor is arranged within the container;
a mechanism for adjusting a position of the lower end of the temperature measurement sensor along a longitudinal direction of the temperature measurement sensor; and
a support part which is arranged above the closing part and which protrudes transverse to the longitudinal direction of the temperature measurement sensor beyond the closing part and a central part, which support part is slidable with respect to a counterpart of an auxiliary equipment, wherein the support part or the counterpart are configured as a plug element or wherein the support part or the counterpart is configured as a sleeve shaped element.

19. The liquid analysis system according to claim 18, further comprising at least one of:
a support, which is adapted to receive a part of the arrangement;
a heater, which is arranged to heat the container from below;
a control system which is adapted to carry out at least one of:
to control the heater;

to receive measurement data from the temperature measurement system; and to process measurement data from the temperature measurement system.

* * * * *